G. W. FERDON.
CAKE AND PIE BOX.
APPLICATION FILED NOV. 20, 1908.
918,742.
Patented Apr. 20, 1909.
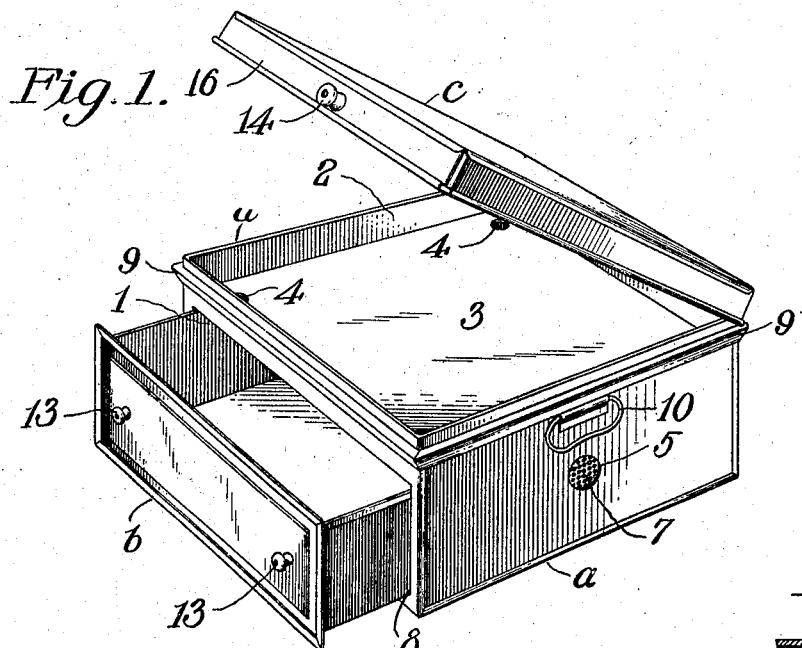
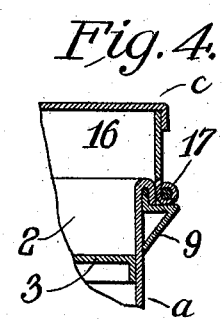
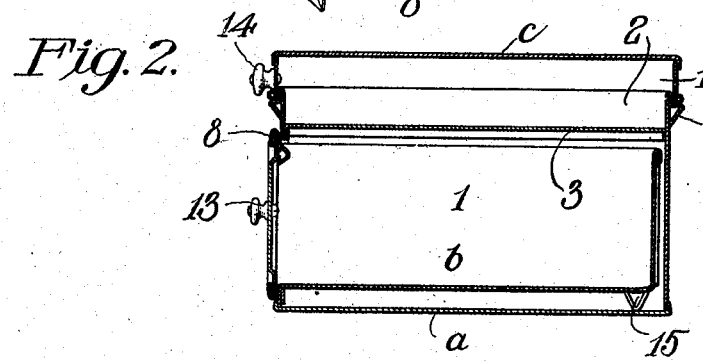
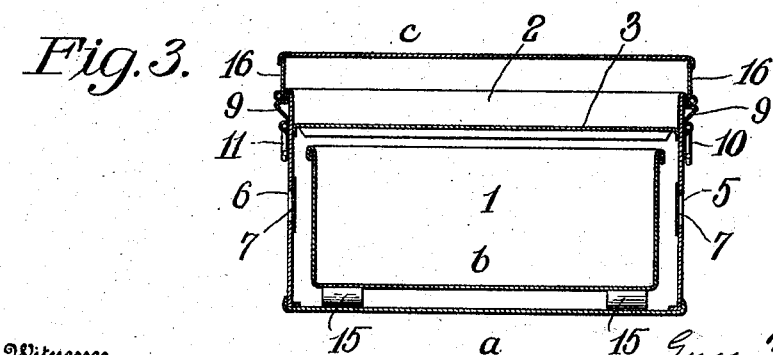
Witnesses
C. E. Smith.
M. E. Smoot.
Inventor
Guy W. Ferdon
By _____, Attorney

UNITED STATES PATENT OFFICE.

GUY W. FERDON, OF CRESSKILL, NEW JERSEY, ASSIGNOR TO SILVER & COMPANY, OF BROOKLYN, NEW YORK, A CORPORATION OF NEW YORK.

CAKE AND PIE BOX.

No. 918,742.　　　Specification of Letters Patent.　　　Patented April 20, 1909.

Application filed November 20, 1908. Serial No. 463,582.

*To all whom it may concern:*

Be it known that I, GUY W. FERDON, a citizen of the United States of America, and a resident of Cresskill, county of Bergen, in the State of New Jersey, have invented a new and useful Improvement in Cake and Pie Boxes, of which the following is a specification.

This invention relates to articles of kitchen shelf or table furniture, and consists in a combined cake box and pie box, and in a novel combination of parts embodied therein, all as hereinafter more particularly described and claimed.

The leading objects of the present invention are to combine a cake box and pie box of simple construction in a single neat and convenient article of manufacture, and thus to economize shelf room or space upon the kitchen table.

Other objects of the invention are to adapt the combined cake box and pie box to exclude vermin of all kinds as well as dust, and at the same time to facilitate manually opening its respective compartments.

Another object is to provide the combined cake box and pie box with ventilating means common to two compartments, one above the other, adapted for appropriation respectively to a pie or pies and to a cake or cakes.

Other objects will be set forth in the general description which follows.

A sheet of drawings accompanies this specification as part thereof.

Figure 1 is a perspective view of the combined cake box and pie box showing both compartments open; Fig. 2 represents a vertical longitudinal section in a central plane through the closed article; Fig. 3 represents a vertical transverse section in a central plane through the same; and Fig. 4 is a fragmentary section on a larger scale through one of the hinges of the pie-box lid.

Like reference characters refer to like parts in all the figures.

The improved article of manufacture is preferably and conveniently constructed of sheet metal, as represented in the drawings, and painted or enameled to harmonize in appearance with other articles of kitchen shelf or table furniture used in connection therewith.

The parts of the article are a rectangular body part, $a$, a drawer, $b$, and a lid, $c$; and its interior forms two rectangular compartments, 1 and 2, designed and adapted respectively for use as a cake box (1) and a pie box (2).

The box part $a$ is constructed with a horizontal partition, 3, which forms the top of the cake compartment and the bottom of the pie compartment, and is provided with corner holes, 4, two of which are shown in Fig. 1, for ventilating the pie compartment. The sides of the box part $a$ are provided with ventilators, 5 and 6, in the form of large holes having internal guards, 7, of finely perforated sheet metal, these holes being in communication with the cake compartment 1 and said corner holes 4 in the partition 3, and therethrough with the pie compartment 2. A suitable opening, 8, in the front of the body part $a$ is fitted to the drawer $b$, and a bead, 9, extending around the body part interacts with the lower edge of the lid $c$.

A pair of folding handles, 10 and 11, hinged to the sides of the body part $a$, provide for handling the article as a whole, and knobs, 13 and 14, on the front of the drawer $b$ and lid $c$, respectively, facilitate manipulating them to open and close the respective compartments.

The drawer $b$ forms the lining of the cake compartment 1, and is spaced from its sides, and also from its bottom and top, as shown in Fig. 3, so as to facilitate the circulation of air in the ventilating process. Such circulation is promoted by the arrangement of the ventilators 5 and 6 in opposite sides of the body part $a$ and in communication with the spaces at the sides and at the bottom and top of the drawer $b$; such spaces being in communication with the pie compartment 2 by way of the ventilating holes 4 in the partition 3. A pair of feet, 15, Figs. 2 and 3, at the inner end of the drawer $b$ operate to keep it level, and to prevent its accidental separation from the body part $a$. Otherwise the drawer is of ordinary construction.

The lid $c$ has a depending marginal rim, 16, the lower edge of which is wired to stiffen the same and to form in connection with a pair of sleeves, 17, Fig. 4, attached to the top of the bead 9, suitable attaching hinges at the rear edge of the lid, one of which is shown in section in Fig. 4.

Other forms of hinge may obviously be employed; wire gauze may be substituted for the sheet-metal guards 7 of the ventilating holes 5 and 6; and other like modifications will suggest themselves to those skilled in the art.

Having thus described said improvement, I claim as my invention, and desire to patent under this specification:

A combined cake box and pie box constructed of sheet-metal and having, in combination, a rectangular body part constructed with a horizontal partition which forms the top of the cake compartment and the bottom of the pie compartment and is provided with corner holes for ventilating said pie compartment, the sides of said body part being provided with ventilating holes communicating with said cake compartment and therethrough with said corner holes, a horizontally slidable drawer forming the lining of said cake compartment and spaced from its sides, and a lid hinged at its rear edge to said body portion and forming the top of the pie compartment and of the box, substantially as hereinbefore specified.

GUY W. FERDON.

Witnesses:
ROBERT McILWAINE,
CHAS. F. PREUSS.